United States Patent
Luo et al.

(10) Patent No.: US 11,200,197 B2
(45) Date of Patent: Dec. 14, 2021

(54) METHOD AND DEVICE FOR DATA DUPLICATION CUTOVER

(71) Applicant: EMC IP Holding Company LLC, Hopkinton, MA (US)

(72) Inventors: Yuan Luo, Shanghai (CN); Ning Xu, Shanghai (CN); Qiu Shang, Shanghai (CN); Mark Yue Qian, Shanghai (CN); Colin He Wang, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 102 days.

(21) Appl. No.: 15/996,690

(22) Filed: Jun. 4, 2018

(65) Prior Publication Data
US 2019/0129886 A1    May 2, 2019

(30) Foreign Application Priority Data

Jun. 2, 2017  (CN) .................. CN 201710408932.3

(51) Int. Cl.
*G06F 16/00* (2019.01)
*G06F 16/11* (2019.01)
(Continued)

(52) U.S. Cl.
CPC .......... *G06F 16/119* (2019.01); *G06F 9/4868* (2013.01); *G06F 9/4881* (2013.01);
(Continued)

(58) Field of Classification Search
CPC .... G06F 16/119; G06F 16/27; G06F 16/1824; G06F 9/4868; G06F 9/4881;
(Continued)

(56) References Cited

U.S. PATENT DOCUMENTS

| 7,165,155 | B1* | 1/2007 | Duprey ............... G06F 11/1451 |
| | | | 711/162 |
| 9,933,957 | B1 | 4/2018 | Cohen et al. |

(Continued)

FOREIGN PATENT DOCUMENTS

| CN | 102739703 | 10/2012 |
| CN | 103544075 | 1/2014 |

(Continued)

OTHER PUBLICATIONS

Prakash Venkat, et al.: "Data Migration Using Write Protection," U.S. Appl. No. 16/263,400, filed Jan. 31, 2019.

*Primary Examiner* — Neveen Abel Jalil
*Assistant Examiner* — Paul Kim
(74) *Attorney, Agent, or Firm* — BainwoodHuang

(57) ABSTRACT

Embodiments of the present disclosure provide a method and device for data duplication cutover. The method includes initiating duplication of initial data from a source device to a destination device, wherein the initial data are data of a file system stored on the source device upon the initiating. The method further includes, in response to completing the duplication of the initial data, updating a session associated with the file system. Furthermore, the method includes, after updating the session, triggering the source device and the destination device into a data unavailable state to perform duplication of delta data from the source device to the destination device, wherein the delta data are data of the file system changed during duplication of the initial data. Utilization of the cutover mechanism proposed in the present disclosure enables effective reduction of data unavailable period of time.

7 Claims, 8 Drawing Sheets

(51) Int. Cl.
  *H04L 29/08* (2006.01)
  *G06F 9/48* (2006.01)
  *G06F 16/27* (2019.01)
  *G06F 16/182* (2019.01)

(52) U.S. Cl.
  CPC .......... *G06F 16/1824* (2019.01); *G06F 16/27* (2019.01); *H04L 67/1095* (2013.01); *H04L 67/14* (2013.01); *H04L 67/141* (2013.01); *H04L 67/143* (2013.01); *H04L 67/1097* (2013.01)

(58) Field of Classification Search
  CPC ...... G06F 3/0607; G06F 3/0629; G06F 3/067; H04L 67/141; H04L 67/143; H04L 67/1095; H04L 67/14; H04L 67/1097
  See application file for complete search history.

(56) References Cited

U.S. PATENT DOCUMENTS

| | | |
|---|---|---|
| 2013/0110778 A1 | 5/2013 | Taylor et al. |
| 2015/0052320 A1 | 2/2015 | Peretz et al. |
| 2016/0274980 A1* | 9/2016 | Kim .................. G06F 11/1453 |
| 2018/0349234 A1 | 12/2018 | Liu et al. |
| 2020/0133553 A1 | 4/2020 | Tylik et al. |
| 2020/0133584 A1 | 4/2020 | Tylik et al. |

FOREIGN PATENT DOCUMENTS

| | | |
|---|---|---|
| CN | 103617096 | 3/2014 |
| CN | 105049258 | 11/2015 |
| CN | 106777225 | 5/2017 |

* cited by examiner

METHOD AND DEVICE FOR DATA DUPLICATION CUTOVER

RELATED APPLICATIONS

This application claim priority from Chinese Patent Application Number CN201710409904.3, filed on Jun. 2, 2017 at the State Intellectual Property Office, China, titled "METHOD AND DEVICE FOR DATA DUPLICATION CUTOVER" the contents of which is herein incorporated by reference in its entirety.

FIELD

Embodiments of the present disclosure generally relate to data duplication, and more specifically, to a method and a device for data duplication cutover.

BACKGROUND

In a technical field of network storage, an NAS (network attached server) is widely used to provide file storage service with a large capacity. Considering a demand of upgrading or expanding NAS system hardware, an NAS device (also referred to as an NAS server, or abbreviated for NAS herein) manager probably needs to face the technical problem of duplicating (also referred to as "migrating" or "moving" herein) data in a source NAS device to a destination NAS device. For example, all file systems installed on an older source NAS device need to migrate to a newer destination NAS device. As the NAS device has a great data capacity, the migration process of the entire device takes a long time, and it usually takes hours, or even days, to complete transfer data from a source to a destination. Considering data safety and integrity, during the whole data migration process (or a part of time thereof), a user will be in a state of being unable to access the NAS, which considerably influences use experience of the user.

Typically, the user is connected to a source NAS device before NAS data migration, and connected to a destination NAS device after migration. For the source and destination devices, there is a cutover process during migration. For an NAS owner or manager, it is often desired to reduce inconvenience brought by NAS data migration or handover to the user. Hence, it has become a challenge how to design a mechanism of data migration handover effectively, thereby providing a more quick cutover process.

SUMMARY

The embodiments of the present disclosure provide a method and a device for providing quick NAS server migration cutover.

According to a first aspect of the present disclosure, there provides a method of data duplication cutover. The method includes: initiating duplication of initial data from a source device to a destination device, the initial data being data of a file system stored on the source device upon the initiating; in response to completing the duplication of the initial data, updating a session associated with the file system; after updating the session, triggering the source device and the destination device into a data unavailable state, to perform duplication of delta data from the source device to the destination device, the delta data being data of the file system changed during duplication of the initial data.

According to a second aspect of the present disclosure, there provides an electronic device for data duplication cutover. The device includes: at least one processing unit; and at least one memory coupled to the at least one processing unit and storing instructions executable by the at least one processing unit, the instructions, when executed by the at least one processing unit, causing the device to perform acts comprising: initiating duplication of initial data from a source device to a destination device, the initial data being data of a file system stored on the source device upon the initiating; in response to completing the duplication of the initial data, updating a session associated with the file system; after updating the session, triggering the source device and the destination device into a data unavailable state to perform duplication of delta data from the source device to the destination device, the delta data being data of the file system changed during duplication of the initial data.

According to a third aspect of the present disclosure, there provides a computer program product. The computer program product is tangibly stored on a non-transient computer readable medium and comprising machine executable instructions which, when executed, cause a machine to perform steps according to the first aspect of the present disclosure.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The above and other objectives, features and advantages of the present disclosure will become more apparent from more detailed description of some embodiments of the present disclosure with reference to the accompanying drawings, in which like reference symbols refer to like elements.

DETAILED DESCRIPTION OF EMBODIMENTS

Figure 1:
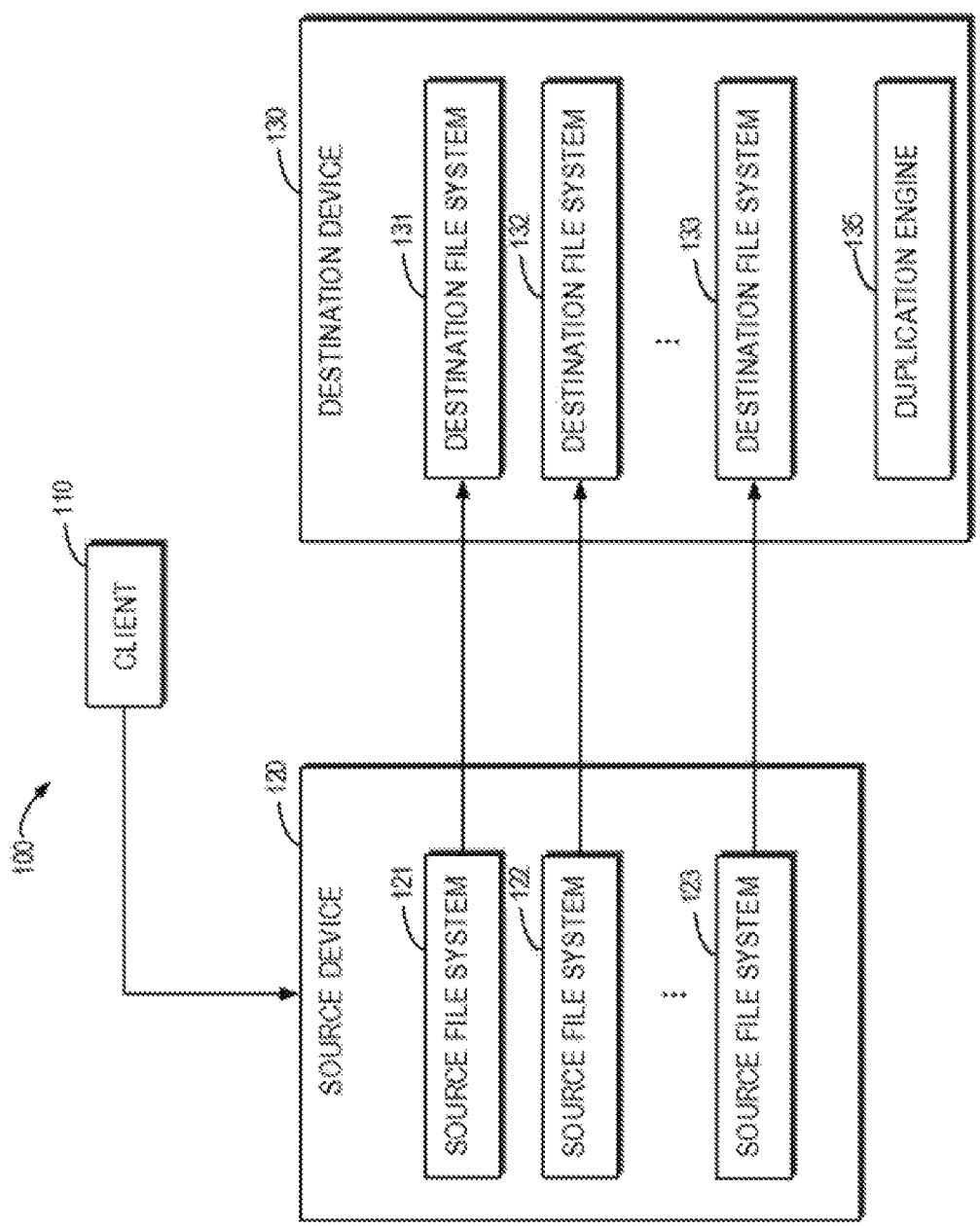
FIG. 1 is a schematic diagram illustrating architecture of data migration cutover processing according to an embodiment of the present disclosure.

Some preferable embodiments will be described in more detail with reference to the accompanying drawings, in which the preferable embodiments of the present disclosure have been illustrated; however, it would be appreciated that the present disclosure can be implemented in various manners, and thus should not be construed to be limited to the embodiments disclosed herein. Rather, those embodiments are provided for thorough and complete understanding of the present disclosure, and completely conveying the scope of the present disclosure to those skilled in the art.

The term "include" and its variations used in the present disclosure mean comprising in an open-ended sense, i.e. "include, but is not limited to." Unless otherwise specified, the term "or" is to be read as "and/or." The term "based on" is to be read as "based at least in part on." The terms "one example embodiment" and "one embodiment" are to be read as "at least one embodiment." The term "another embodiment" is to be read as "at least one another embodiment." The terms "first," "second" and the like may refer to different or the same objects. Other explicit and implicit definitions may further be included in the following description.

The term "duplicating/copying" used herein can be utilized interchangeably with "migrating" and "moving." Embodiments of the present disclosure are described based on a server and file systems, only by way of example.

Typically, an NAS device stores thereon a plurality of relatively independent file systems for providing a plurality of users with network file system protocol (NFS) based service. During NAS migration, these file systems installed on a source NAS server are duplicated to file systems installed on a destination NAS server, which often takes long time (for example, from several hours to days). The NAS server may include tens of, hundreds of, or even more file systems, each performing independently a file system level duplication which is known as an In-band Migration Toolkit (IMT) duplication session.

In the duplication process, a cutover process from the source NAS to the destination NAS is performed. The user is connected to the source NAS prior to the cutover process, and after completion of the cutover process, the user is then connected to the destination NAS and provided with file system service by the destination NAS. The user might be unaware of that the NAS he/she is using undergoes data migration and a cutover process. It would be appreciated that, in each file system level duplication process, the NAS is unable to provide data connectivity within a certain period of time since the start of duplication, considering integrity or safety of the data within the file system. It is because that the user's access operation to the file system during the data migration process would bring about a problem to NAS. This period of time is called a data unavailable (DU) period of time.

In tradition, once data migration is started, it needs to disconnect the connection between an external user and the NAS server, to protect data safety during the migration process. However, the solution has a distinct disadvantage in the case of a time-consuming migration process. For a commercial NAS server, an acceptable DU period of time cannot be too long, for example, the DU period of time is required not to exceed 90 seconds for an NAS having hundreds of file system. Since the NAS server is relatively sensitive to the DU period of time, it is desired to propose a migration mechanism capable of effectively shortening the DU period of time.

To solve the above and other potential problems at least in part, example embodiments of the present disclosure propose a mechanism for implementing a fast NAS migration cutover. The mechanism divides a data duplication process into two stages and optimizing the migration cutover process for the two stages respectively, thereby effectively improving the cutover efficiency and shortening the data unavailable period of time.

FIG. 1 is a schematic diagram illustrating architecture of data migration cutover according to an embodiment of the present disclosure. It should be appreciated that the structure and function of the architecture 100 are described only for illustrative purpose instead of implying any limit to the scope of the present disclosure. Embodiments of the present disclosure can be embodied in different structures and/or functions.

As shown in FIG. 1, the architecture 100 may include a client 110, a source device 120 and a destination device 130. A plurality of source file systems 121-123 are installed on the source device 120, and will be migrated from the source device to the destination device during data migration. After migration is completed, a plurality of destination file systems 131-133 corresponding to the source file systems will be located on the destination device 130. For example, the source device 120 and the destination device 130 may be a server. Specifically, the source device 120 may be an older type of an NAS server, and the destination device 130 may be a newer type of a file server. Alternatively, the source device 120 may be a device equivalent to the destination device.

It would be appreciated that any number of source file systems may be installed on the source device 120, each source file system being capable of performing a file system level duplication which is known as an In-band Migration Toolkit (IMT) duplication session. A plurality of file system level duplications can be implemented simultaneously. During data duplication, the client 110 may access the source device 120, and change data in these file systems.

The architecture 100 may further include a duplication engine 135 which is installed on the destination device 130 to control data duplication from each of the source file systems 121-123 to each of the destination file systems 131-133.

Figure 2:
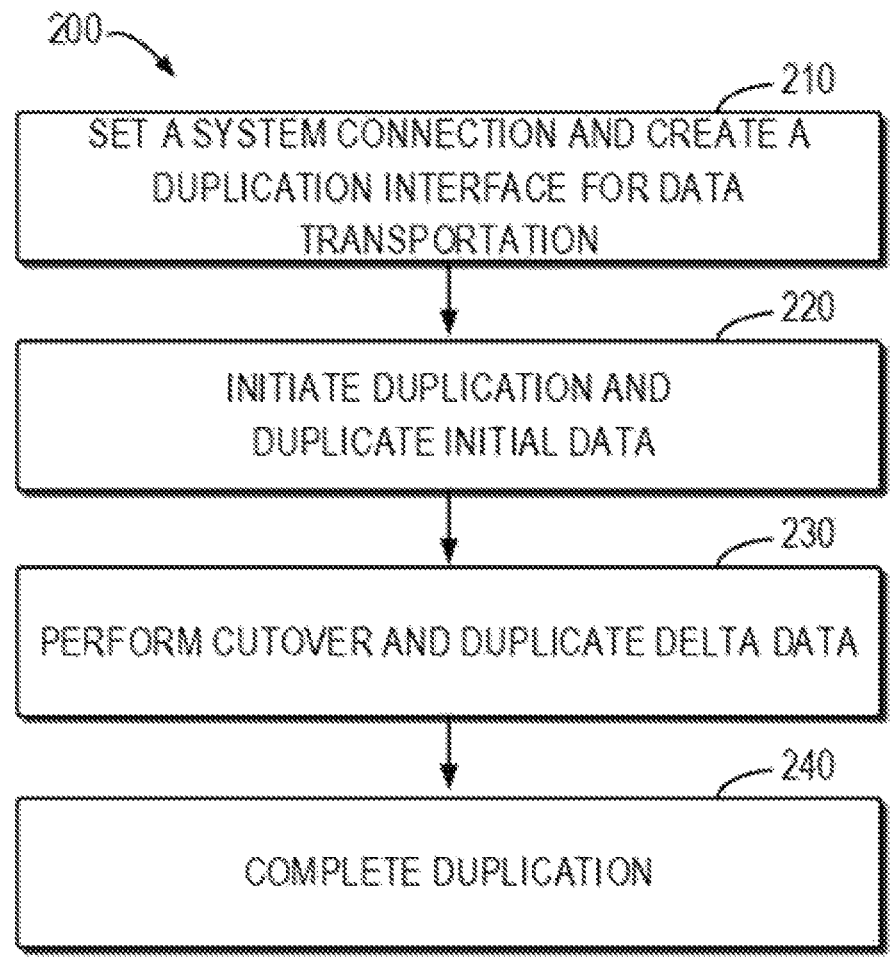
FIG. 2 is a flow chart illustrating data migration cutover processing according to an embodiment of the present disclosure.

FIG. 2 is a flow chart of data duplication processing 200 according to an embodiment of the present disclosure. For example, the data duplication processing 200 can be performed by the duplication engine 135 shown in FIG. 1. It should be appreciated that the data duplication processing 200 may further include additional acts not shown and/or omit some acts as shown, and the scope of the present disclosure is not limited in this regard.

The data duplication processing 200 starts from a block 210. At block 210, a connection between two NAS servers is provided to create a server level duplication session. Assume that the source device 120 as shown in FIG. 1 is installed thereon with three source file systems 120-123, the server level duplication session can have three file system level IMT duplication sessions performed simultaneously. Based on the duplication sessions, the duplication engine may manage a duplication process corresponding to each file system between the source device 120 and the destination device 130.

At block 220, for each file system level duplication session, data duplication is initiated to duplicate initial data (also referred to as historical data) existing on the source file system upon initiating the duplication to a destination file system. The stage is referred to as an initial stage of the duplication. At the initial stage, the user may be still connected to the source file system and perform the data access operation, but any data change occurring at this stage is not duplicated to the destination device at the initial stage.

At block 230, a duplication engine receives a cutover command from an administrator, and delta data are duplicated for duplication session of each file system level. First, the operation need to remove the duplicated IMT session created at the initial stage for duplicating the initial data, and create an IMT session for duplicating the delta data. Herein, the delta data at least include changed data accumulated at the source file system in the initial stage, and the stage after the initial stage is referred to as a delta stage of the duplication. It would be appreciated that the above changed data may include data newly added by the user, data deleted by the user and data changed by the user.

At block 240, the duplication engine 135 deletes the file system level duplication session, the entire duplication process is then completed, and the NAS service is provided to the user by the destination device.

It can be seen that, in the embodiment of the present disclosure, the file system level duplication session is implemented in two stages: an initial stage and a delta stage. At the initial stage of the duplication, an IMT session will be created to duplicate initial data existing on the source file system 121 upon the duplication is initiated into the destination file system 131. At the delta stage of the duplication, the IMT session created at the initial stage will be removed and an IMT session for duplicating delta data will be created. As the file system data migration process is divided into two stages in the embodiment, it can be achieved that the external user can still normally use the NAS server for data access during the migration process of the initial data (i.e., initial stage), thereby effectively improving the user experience.

In the above solution, after entering into the block 230, there is a data unavailable (DU) period of time. That is, after receiving the cutover command sent from the administrator and starting to perform the cutover process, the duplication engine will control entry of each file system into the duplication of delta data. At this stage, the user will not be connected to the source device for a period of time, nor can he/she be connected to the destination device. The unavailable period of time will last until the delta stage of the duplication is completed. Hereinafter, the external user will be connected to the destination device and access the file system within the destination device. The unavailable period of time is necessarily provided to ensure data integrity, but it inevitably affects the use experience of a user.

Figure 3:
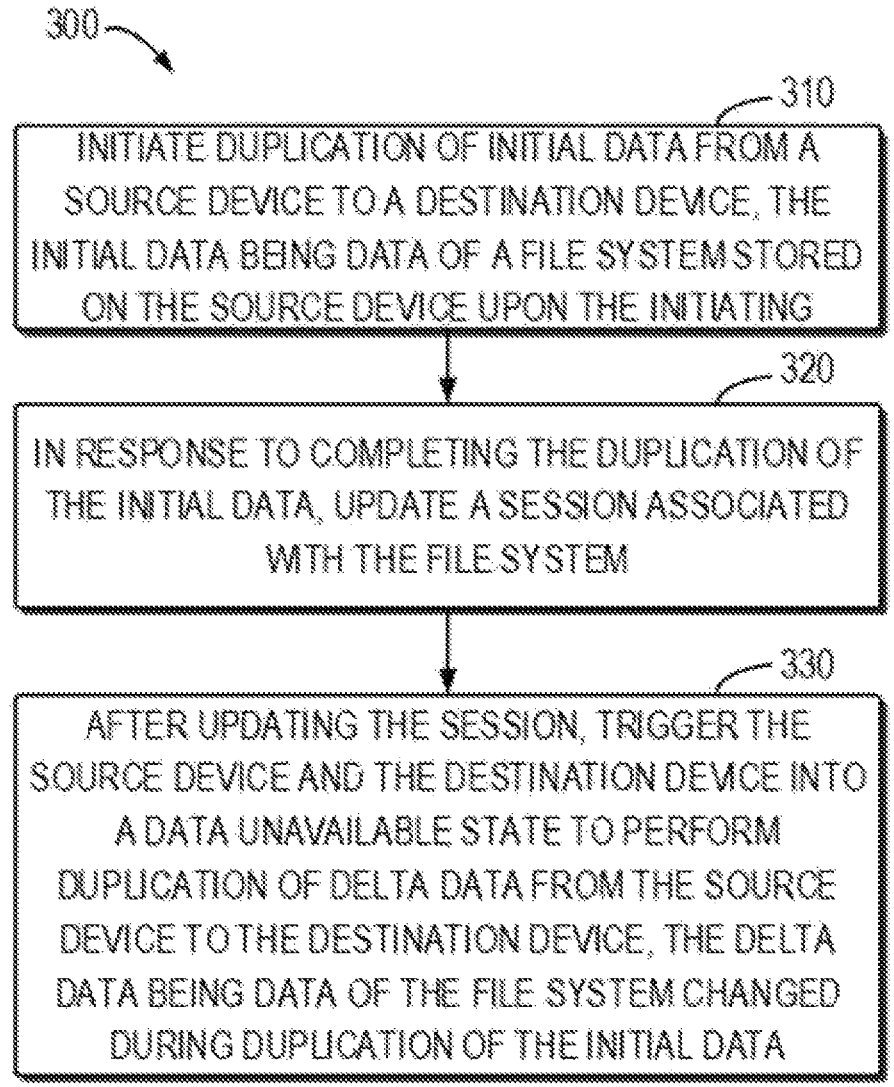
FIG. 3 is a flow chart illustrating a method of implementing data migration cutover processing according to an embodiment of the present disclosure.

FIG. 3 is a flow chart of a method of implementing a data migration cutover process according to an embodiment of the present disclosure. The embodiment provides a further improvement to the preceding embodiment. The method 300 for example may be performed by the duplication engine 135 as shown in FIG. 1. It would be appreciated that the method 300 may further include additional blocks not shown and/or omit some blocks as shown. The scope of the present disclosure is not limited in this regard.

At a block 310, the duplication engine 135 initiates duplication of data from the source file system 121 on the source device to the destination file system 131 on the destination device. As stated above, the duplication of data is divided into two stages: an initial stage and a delta stage, which will be described in great detail below with reference to FIGS. 4 and 5

Figure 4:
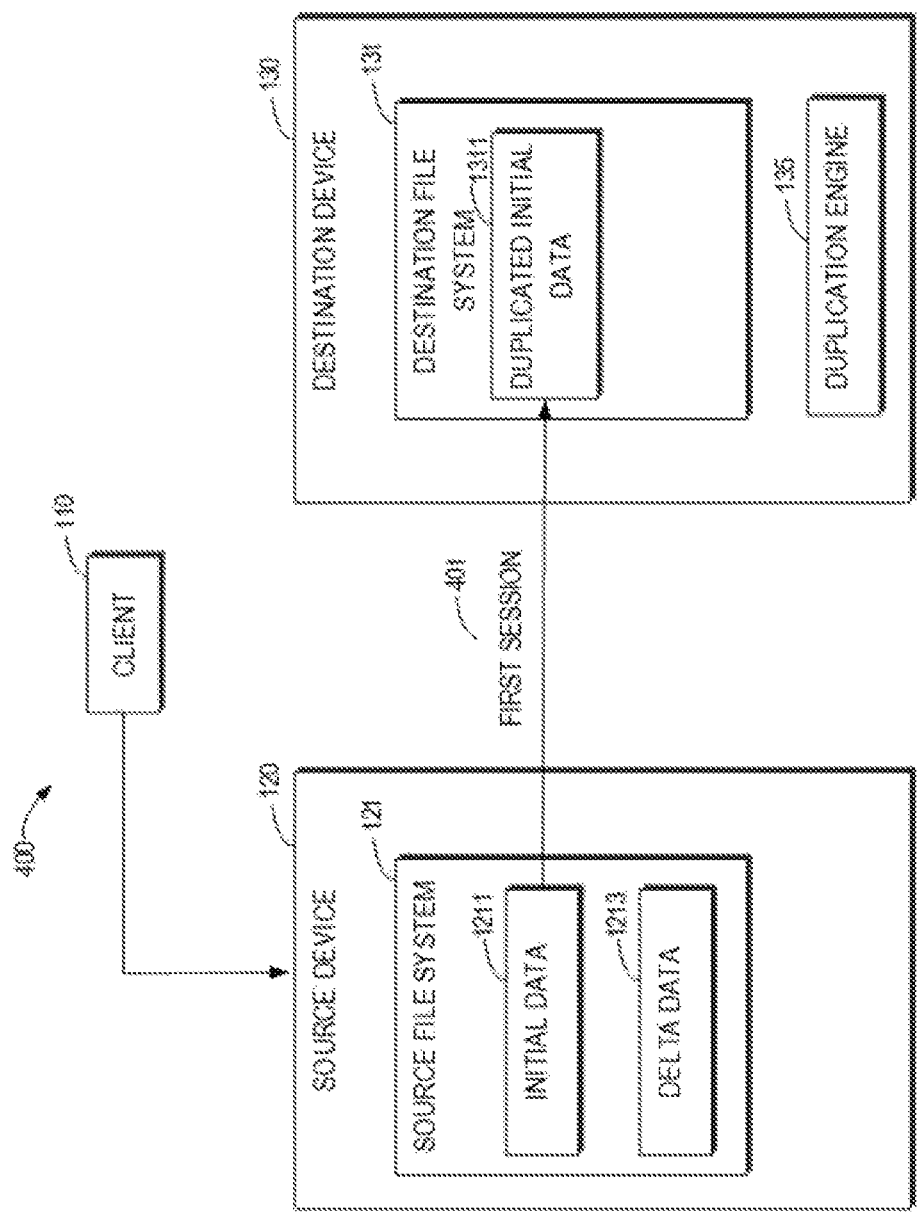
FIG. 4 is a schematic diagram illustrating a duplication process of initial data according to an embodiment of the present disclosure.

FIG. 4 is a schematic diagram illustrating a duplication process 400 of initial data according to an embodiment of the present disclosure. It would be appreciated that, for brevity of description, FIG. 4 only shows a single source file system 121 in the source device and a single destination file system 131 in the destination device. In fact, the source device may for example include hundreds of other file systems similar to the source file system 121, each being duplicated to the destination device during migration. Each of the file systems individually performs a file system level duplication process which is known as an In-band Migration Toolkit (IMT) duplication session.

At an initial stage 400, initial data existing on the source file system 121 when the duplication is initiated are duplicated. Specifically, when the duplication is initiated, the duplication engine 135 scans (traverses) data existing on the source file system 121. The scanned data are regarded as the initial data 1211 to be duplicated at the initial stage. Wherein, as a modification to the file data temporarily not scanned will be scanned eventually, it is considered as initial data 1211. Conversely, a modification to the scanned file data is considered as delta data.

After the scan is completed, the duplication engine will create, for each file system, an IMT session 401 (hereinafter referred to as a first session) associated with the duplication of the initial data, to duplicate the initial data 1211 to the destination file system 131 as duplicated initial data 1311. At the initial stage 400 of the duplication, the client 110 can still access the source device 120 persistently, to generate delta data 1213 in the source file system 121. It would be appreciated that, at the initial stage 400, the delta data 1213 are only recorded without being duplicated to the destination device.

The IMT session for the initial stage 400 is not completed until all initial data 1211 existing on the source file system 121 upon duplication is initiated are duplicated to a destination side.

Returning to FIG. 3, at the block 320, in response to completing duplication of the initial data, the session associated with the file system is updated. In the step, the duplication engine 135 will remove the first session 401 created at the initial stage 400, and create a session (hereinafter referred to as a second session) associated with the subsequent delta stage of the duplication. After the second session is created, the duplication engine 135 will keep the second session in a suspending state of waiting for start, rather than immediately initiating the second session into the delta phase of the duplication.

It is noted that, in the embodiment, upon completing the initial stage of the duplication, the duplication engine 135 immediately performs operations of removing the first session associated with the duplication of the initial data and creating the second session associated with the duplication of the delta data, and enables the second session in a state of waiting for start. Since the cutover processing is not started (i.e., the duplication process of the delta data is not started) when the above operation of updating the session is performed, the external user can access the source file system persistently, and thus the source device has not entered in the data unavailable period of time at this time. As compared to the embodiment described with reference to FIG. 2, in the further improved embodiment, the operation of updating the session which is originally performed in the data unavailable period of time after initiating the cutover processing, is performed before the cutover processing and after completing the initial stage of the duplication, and the duplication engine is triggered to perform the cutover processing after updating the session, i.e., triggering the source device and the destination device into a data unavailable stage, so as to duplicate the delta data to the destination file system.

The operations of the block 320 are based on the following insights: after the duplication of the initial data is completed, the session associated with the duplication of the initial data will be useless and need to be removed; and a session associated with the duplication of the delta data will be established to perform the duplication of the delta data. In the embodiment corresponding to FIG. 2, such process is scheduled after the cutover processing being initiated and is regarded as a preparation operation of the delta stage of the duplication, therefore occupies the data unavailable period of time. If the operation of updating the session is innovatively shifted to be performed after completing the data duplication and before starting the cutover process, the operations performed in the data unavailable period of time can be reduced as much as possible, and a reduction of the operations does not result in adverse influences on the entire data migration process. Therefore, the length of the data unavailable period of time can be reduced as much as possible, so as to provide better use experience for the user.

In one embodiment, at the initial stage, the duplication engine further performs the following operation of: duplicating configuration information associated with a network file system (NFS) from the source device to the destination device. The configuration information may be, for example, configuration information associated with exports or quotas.

Still referring to FIG. 3, in block 330, after the session is updated, the administrator will send a command to trigger the duplication engine into the cutover process and further trigger the source device and the destination device into a data unavailable state, so as to perform duplication of the delta data from the source device to the destination device. As stated above, the delta data are data of the source file system 121 changed during the duplication of the initial data.

Figure 5:
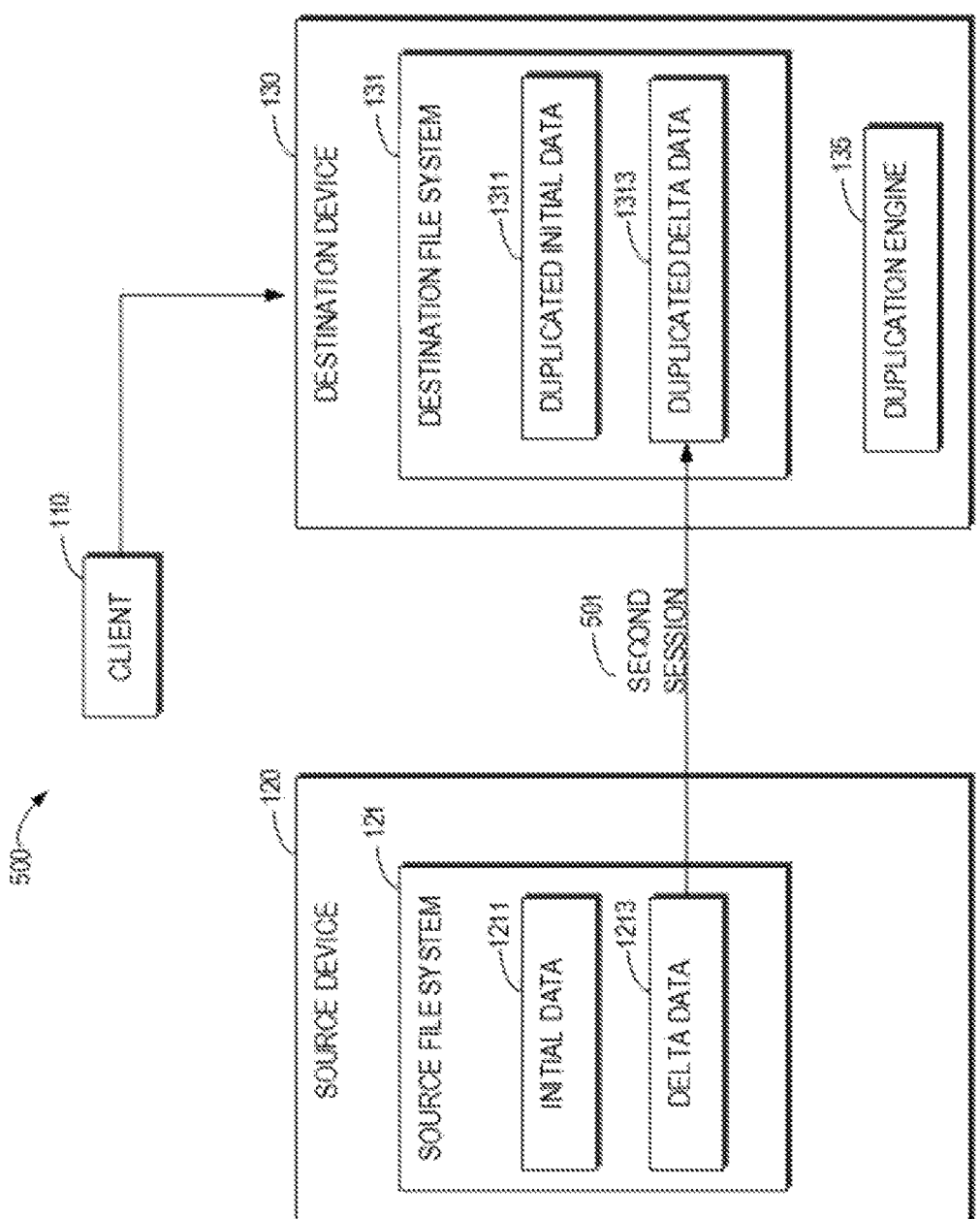
FIG. 5 is a schematic diagram illustrating a duplication process of delta data according to an embodiment of the present disclosure.

FIG. 5 is a schematic diagram illustrating a duplication process 500 of delta data according to an embodiment of the present disclosure. It would be appreciated that, for brevity of the description, FIG. 5 similar to FIG. 4 only shows a single source file system 121 in the source device and a single destination file system 131 in the destination device. In fact, the source device may for example include hundreds of other file systems similar to the source file system 121, each of which individually performs a duplication process of duplicating the delta data to the destination file system 131.

At a delta stage 500 of the duplication, the delta data 1213 accumulated at the initial stage of the duplication will be duplicated to the destination file system 131 and become the duplicated delta data 1313. For each file system, the duplication engine will initiate the previously created second session being in a state of waiting for start, and perform the duplication process for the delta data. At the delta stage 500 of the duplication, the client 110 will be unable to access the source device 120 or the destination device 130. This data unavailable state will last until the delta stage 500 is ended. It would be appreciated that, after such data unavailable state is ended, the user will be able to be connected to the destination device 130 to enable the access to the destination file system 131.

It is seen that, as compared to the embodiment described with reference to FIG. 2, the above embodiment of the present disclosure can further shorten the data unavailable period of time effectively by shifting updating the session of the file system associated with the duplication process into a stage before the cutover processing.

In the foregoing embodiment, the duplication engine 135 initiates a plurality of sessions in the following manner: second sessions at a suspending state are initiated one by one, i.e., only after ensuring that one of the second sessions is successfully initiated, the operation of initiating a further second session is then performed. In another embodiment of the present disclosure, in order to further improve the efficiency of the cutover processing, an asynchronous processing mechanism is further provided. Specifically, after entering into the delta stage of the duplication, the duplication engine will perform a "cluster imitation" on a set of a plurality of second sessions. The plurality of second sessions for example may be all or a part of the second sessions. In the "cluster initiation" manner, for each of the plurality of second sessions, initiation commands are issued together, and whether they are successfully initiated after issuing is not learned afterwards, for it is assumed that each of the second sessions has been started and started automatically. Subsequently, the duplication engine 135 will send a command of inquiring a current session state to each second session periodically, so as to learn whether each second session has been completed. By adopting the parallel manner as stated above, managing a plurality of second sessions can be accomplished more efficiently and time can be further saved.

Figure 6:
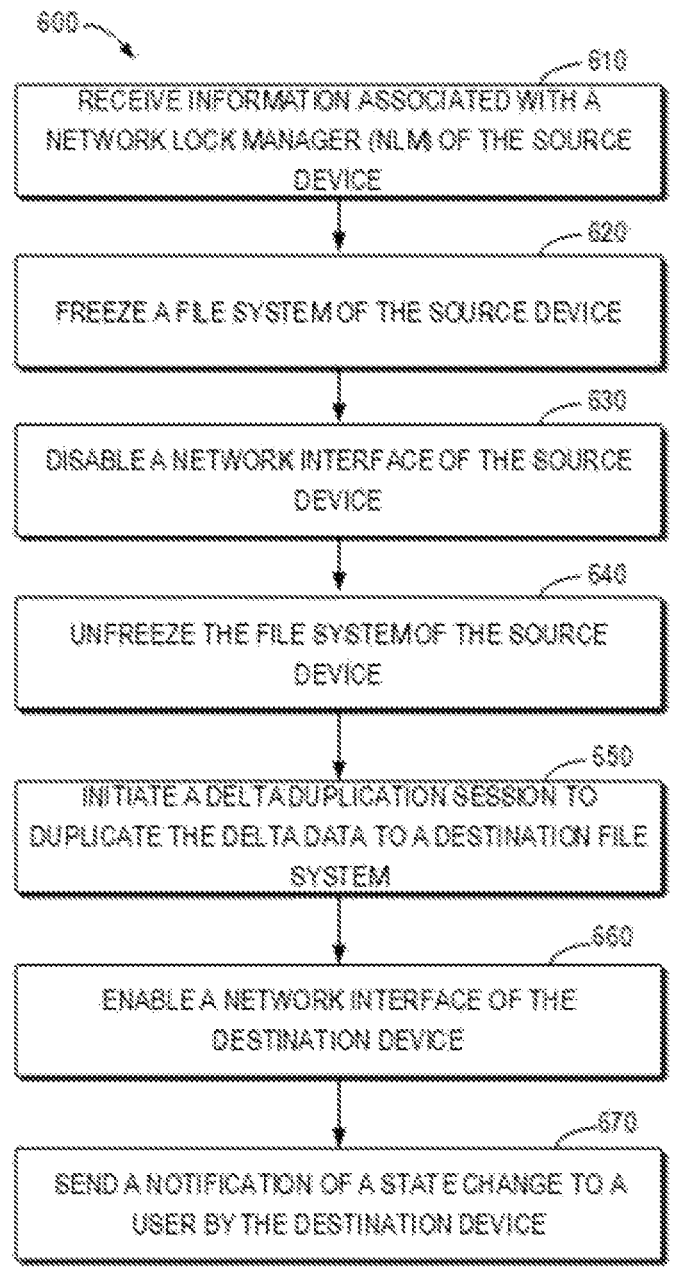
FIG. 6 is a flow chart of a cutover initiating process according to an embodiment of the present disclosure.

FIG. 6 is a flow chart of initiating a cutover process according to an embodiment of the present disclosure. According to the embodiment, after the duplication engine 135 of the destination device receives a cutover command sent from an administrator, the cutover process performed specifically includes the following steps:

In block 610, information associated with a network lock manager (NLM) of a source device is received, the information including user information and file lock information.

In block 620, a file system of the source device is frozen. In fact, for the source file system, an I/O operation is performed until the block 620. At this time, a part of the I/O of the source file system probably has been written, and is being written into a cache of the operating system. If the cutover processing does not freeze the file system, the data in the cache will not be written into a disk, thereby causing data loss. After the file system is frozen, any other associated operations such as NFS operation, NLM lock operation and the like, will be declined. That is, from the block 620, the data unavailable period of time is started.

In block 630, a network interface of the source device is disabled, and the network interface at the destination device is recovered.

In block 640, the file system of the source device is unfrozen to prepare for a delta data duplication process starting at block 650.

In block 650, a delta duplication session is initiated to duplicate the delta data to a destination file system. It would be appreciated that the block 650 is a crucial step of the entire cutover processing.

In block 660, a network interface of the destination device is enabled. Since then, the destination device can provide service to an external user. It would be appreciated that the data unavailable period of time ends by this time.

In block 670, the destination device sends a notification of a state change to the user based on the NLM lock.

Therefore, the data unavailable period of time starts from the block 620 and ends at the block 660. During this period, the operation related with the duplication of the delta data performed at the block 650 is the most crucial step. It would be appreciated that respective steps corresponding to the blocks, except for the block 650, are auxiliary or replaceable, which may be modified, removed or added by the NAS manager according to the actual conditions.

Figure 7:
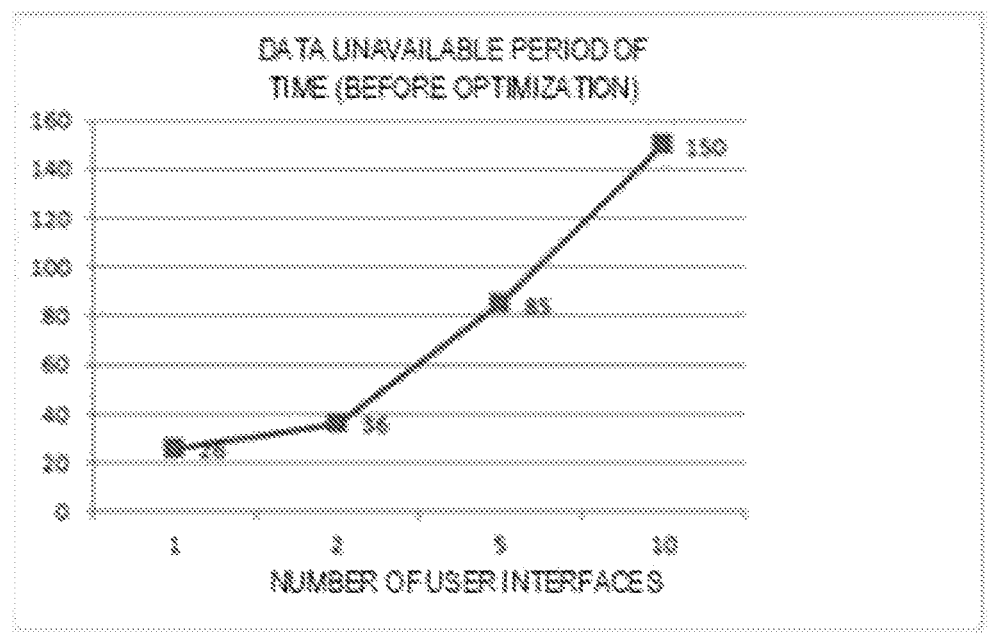
FIG. 7 is a schematic diagram illustrating an optimizing effect according to an embodiment of the present disclosure.
Figure 7:
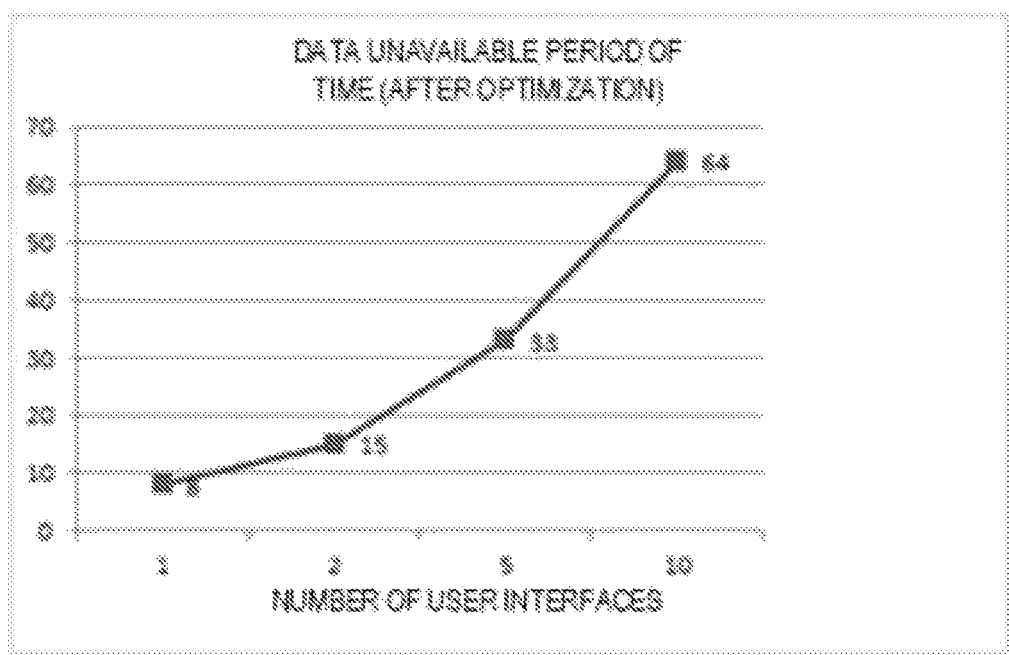

FIG. 7 is a schematic diagram illustrating an optimizing effect according to an embodiment of the present disclosure. In FIG. 7, an upper figure shows an experimental measurement result of the user unavailable period of time according to the embodiment described with reference to FIG. 2 of the present disclosure. As seen therefrom, the corresponding data unavailable period of time grows with an increased number of network interfaces that the NAS device can provide to the user. When the number of user interfaces for example is 5, the data unavailable period of time is 85 seconds. In FIG. 7, a lower figure shows a statistical result of a user unavailable period of time in an optimized solution described according to the other embodiments of the present disclosure. The optimized solution may include: shifting the step of updating the session associated with the file system from the delta duplication stage after the cutover processing is stared to a stage before the cutover processing. The optimized solution may further include: based on an asynchronous mechanism, initiating in parallel a plurality of sessions associated with delta duplication, and performing the delta duplication. It is seen therefrom that, when the number of user interfaces is 5, the corresponding data unavailable period of time is remarkably shortened to 33 seconds. The same conclusion would be drawn from examples having other numbers of user interfaces.

Hence, by utilizing the solution proposed in the present disclosure, a more reasonable design of a mechanism for data migration cutover and more efficient implementing of the cutover processing of NAS duplication can be realized, thereby providing significantly shortened data unavailable period of time and thus improving the use experience of the user.

Figure 8:
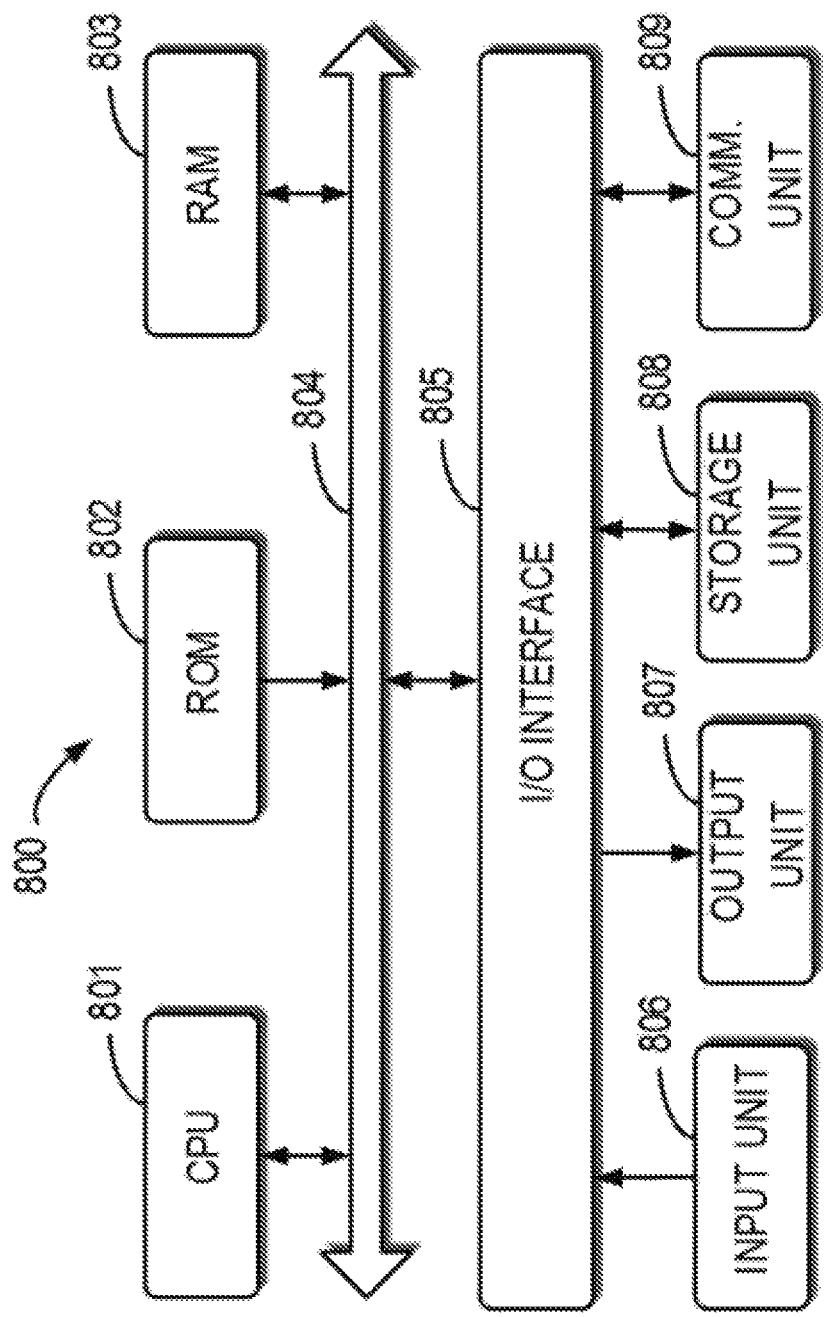
FIG. 8 is a schematic block diagram illustrating an example device that may be used to implement embodiments of the present disclosure.

FIG. 8 is a schematic block diagram of an example device 800 for implementing embodiments of the present disclosure. As indicated, the device 800 comprises a central processing unit (CPU) 801, which can execute various appropriate acts and processes based on computer program instructions stored in a read-only memory (ROM) 802 or the computer program instructions loaded into a random access memory (RAM) 803 from a storage unit 808. The RAM 803 also stores all kinds of programs and data required by operating the storage device 800. CPU 801, ROM 802 and RAM 803 are connected to each other via a bus 804. An input/output (I/O) interface 805 is also connected to the bus 804.

A plurality of components of the device 800 are connected to the I/O interface 805, comprising: an input unit 806, such as keyboard, mouse and the like; an output unit 807, such as various types of displays, loudspeakers and the like; a storage unit 808, such as magnetic disk, optical disk and the like; and a communication unit 809, such as network card, modem, wireless communication transceiver and the like. The communication unit 809 allows the device 800 to exchange information/data with other devices through computer networks such as Internet and/or various telecommunication networks.

The above described procedures and processes, such as the method 300, can be implemented by the processing unit 801. For example, in some embodiments, the method 300 can be implemented as computer software programs, which are tangibly embodied on a machine-readable medium, such as the storage unit 808. In some embodiments, part or all of the computer program can be loaded to and/or installed on the device 800 via ROM 802 and/or the communication unit 809. The computer program, when loaded to RAM 803 and executed by CPU 801, may execute one or more acts of the above described method 300. Alternatively, CPU 801 can also be configured to implement the above described method 300 via any other suitable manner (for example, by means of firmware).

The present disclosure may be a method, a device, a system, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, device (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A method of data duplication cutover, comprising:
   initiating duplication of initial data from a source device to a destination device, the initial data being data of a file system stored on the source device upon the initiating;
   in response to completing the duplication of the initial data, updating a session associated with the file system;
   after updating the session, triggering the source device and the destination device into a data unavailable state and performing duplication of delta data from the source device to the destination device while in the data unavailable state, the delta data being data of the file system changed during duplication of the initial data, wherein triggering the source device and the destination device into the data unavailable state includes:
   freezing the file system of the source device, and
   disabling a network interface of the source device; and
   after performing duplication of delta data from the source device to the destination device while in the data unavailable state, enabling a network interface of the destination device;
   wherein performing duplication of delta data from the source device to the destination device includes unfreezing the file system of the source device.

2. A method of data duplication cutover, comprising;
   initiating duplication of initial data from a source device to a destination device, the initial data being data of a file system stored on the source device upon the initiating;
   in response to completing the duplication of the initial data, updating a session associated with the file system; and
   after updating the session, triggering the source device and the destination device into a data unavailable state and performing duplication of delta data from the source device to the destination device while in the data unavailable state, the delta data being data of the file system changed during duplication of the initial data,
   wherein updating a session associated with the file system comprises;
   deleting a first session associated with duplication of the initial data;
   creating a second session associated with duplication of the delta data; and
   setting the second session associated with duplication of the delta data in a waiting state.

3. The method according to claim 1, further comprising;
   during the data unavailable state, initiating in parallel a plurality of sessions associated with the duplication of the delta data in a waiting state.

4. An electronic device, comprising;
   at least one processing unit; and
   at least one memory coupled to the at least one processing unit and storing instructions executable by the at least one processing unit, the instructions, when executed by the at least one processing unit, causing the device to perform acts comprising:

initiating duplication of initial data from a source device to a destination device, the initial data being data of a file system stored on the source device upon the initiating;

in response to completing the duplication of the initial data, updating a session associated with the file system; and after updating the session, triggering the source device and the destination device into a data unavailable state to perform duplication of delta data from the source device to the destination device while in the data unavailable state, the delta data being data of the file system changed during duplication of the initial data, wherein updating a session associated with the file system comprises:

deleting a first session associated with duplication of the initial data;

creating a second session associated with duplication of the delta data; and setting the second session associated with duplication of the delta data in a waiting state.

5. A computer program product for data deduplication cutover, the computer program product comprising a non-transitory computer readable medium encoded with computer-executable code, the code configured for the execution of:

initiating duplication of initial data from a source device to a destination device, the initial data being data of a file system stored on the source device upon initiating;

in response to completing the duplication of the initial data, updating a session associated with the file system;

after updating the session, triggering the source device and the destination device into a data unavailable state and performing duplication of delta data from the source device to the destination device while in the data unavailable state, the delta data being data of the file system changed during duplication of the initial data; and during the data unavailable state:

freezing the file system of the source device;

disabling a network interface of the source device;

after disabling the network interface, unfreezing the file system of the source device;

after unfreezing the file system, initiating in parallel a plurality of sessions associated with the duplication of the delta data in a waiting state; and after completing the plurality of sessions associated with the duplication of the delta data, enabling a network interface of the destination device.

6. The method according to claim 2, wherein performing duplication of delta data from the source device to the destination device while in the data unavailable state includes triggering delta duplication by the second session to exit the waiting state.

7. The device according to claim 4, wherein performing duplication of delta data from the source device to the destination device while in the data unavailable state includes triggering delta duplication by the second session to exit the waiting state.

\* \* \* \* \*